Aug. 30, 1927.

W. C. BELMONTE 1,640,687

COMBINED MEDICINAL PENCIL AND INHALER

Filed July 18, 1924

Inventor
William C. Belmonte
By his Attorneys

Patented Aug. 30, 1927.

1,640,687

UNITED STATES PATENT OFFICE.

WILLIAM C. BELMONTE, OF NEW YORK, N. Y.

COMBINED MEDICINAL PENCIL AND INHALER.

Application filed July 18, 1924. Serial No. 726,690.

This invention relates to certain improvements in holders for holding sticks or cartridges of medicinal and other preparation intended either for inhaling or applying the stick to the person of the user.

It is one object of the present invention to provide a holder and a stick, such as a menthol stick which may be used both for inhalation and application, in which the stick is anchored in the holder so that it cannot be readily dislodged or broken when being applied, as by rubbing or if the holder and stick were accidentally dropped, the casing and the stick being so constructed that a good air circulation is provided for inhalation purposes when desired.

A further object of the invention is to provide a holder and stick which shall be cheap, attractive in appearance, of small size so as to be conveniently carried, and an improved anchor for the stick, this anchor being of such character that if desired it may be removed from the casing and another anchor and stick substituted, thus in effect being a stick refill, so that the holder may be used for a long time.

With these and other objects not specifically referred to in view, the invention consists of certain novel parts, arrangements and combination which will be described in connection with the accompanying drawings, and the novel features pointed out in the claims hereunto annexed.

Referring to these drawings,—

Figure 1:
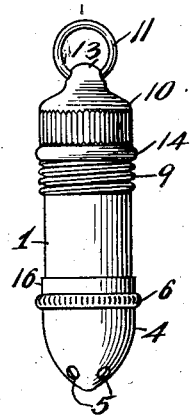
Figure 1 is a side view of an improved holder, the holder being shown closed.

Referring now to these drawings, the invention has been shown as embodying a holder for a stick of menthol for which the holder has been particularly designed, but it will be understood that the holder may be used for sticks of other preparations which are intended for application to the person or for inhaling. The holder selected to illustrate the invention includes a casing 1, which is or may be cylindrical in shape, the casing having a pointed head 2 provided with apertures 3, these apertures being provided in the casing, where the preparation is to be used in part, for inhalation. The apertures 3 in the head 2 of the casing are closed by a cap or shutter 4 provided with holes 5 which may be brought into registry with the holes 3 by rotating the cap. The cap is rotatably retained on the head by means of a groove 6 formed in the cap which engages a bead 7 formed on the head. The end of the casing, opposite the head, is open and is provided with threads 8 with which may engage threads 9 on the end of a base member 10, which is or may be provided with a handle in the form of a ring 11 passed through openings 12 in a knob 13 formed on the end of the base, these openings, for the purpose hereinafter referred to, being somewhat larger than the ring so as to permit air to pass into the base.

The base is also provided with a bead 14, the edge of which forms a shoulder 15, and the base above the bead is formed with a narrow smooth rim or flange 16 provided with opposed cutouts 17.

Figure 2:
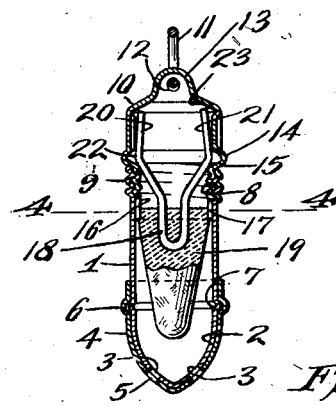
Figure 2 is a sectional view of the holder shown in Fig. 1.
Figure 3:
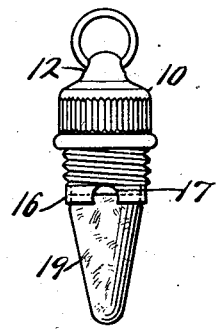
Figure 3 is a view of the stick and base removed from the holder casing.
Figure 4:
Figure 4 is a cross section, the section being taken on line 4—4 of Fig. 2.

Preferably removably secured in this base is an anchor which forms one of the important features of the invention. This anchor may be of various configurations, but it will include a part which may be embedded in the stick material, and a part which will engage with the base so that the stick material is securely held by the anchor and will not tend to break off from the base when applied to the person of the user or if accidentally dropped. In the particular construction shown, this anchor is in the form of a piece of spring wire bent to form a loop 18 which will embed in the material of the stick 19, as shown in Fig. 2. From the loop the wire is bent outwardly and then downwardly to form legs 20, 21 and a shoulder 22 which will take under the shoulder 15, before referred to, the spring of the wire permitting the legs to snap in under the shoulder when the anchor is inserted in the base. The legs 20, 21 are of sufficient length to engage the inner end of the base, which is turned in, as indicated at 23 in Fig. 2. This construction affords a firm anchorage for the stick and holds the stick firmly in position. At the same time, if desired, the anchor and the stick can be removed and another stick provided with an anchor and inserted in the holder.

In producing the holder and stick in the best embodiment of the invention, the anchor is associated with the base and the base is then inserted in the menthol stick while the stick is in a mold and in a more or less plastic condition. When the stick is thus assembled, the flange or rim 16 of the base is brought into contact with the menthol, so that the menthol as it solidifies adheres to the flange 16 of the base before referred to, this engagement of the stick with the base aiding in maintaining the stick in position.

It will be seen that a good circulation of air is provided through the holder when it is used for inhalation, the air passing through the openings 12 and the cutouts 17 up past the stick and through the openings 3, 5 in the cover of the holder.

While the holder has been shown and described in its preferred form, it will be understood that certain changes and variations may be made in the specific construction of the holder and of the anchor without departing from the invention as defined in the appended claims.

What I claim is:

1. A holder for sticks of medicinal and other preparations, comprising a base having an interior recess, a shoulder in the recess, an anchor member having a loop embedded in the stick, resilient projections from the loop seating under the shoulder, a casing detachably secured to the base, and means for providing for a circulation of air through the holder.

2. A holder for sticks of medicinal and other preparations, comprising a base having an interior recess, a shoulder in the recess, an anchor of spring wire bent to form a loop for embedding the anchor in a stick, and to form legs frictionally seating under the shoulder so that it can be removed and placed in the base with the stick, a casing detachably secured to the base, and means for providing for a circulation of air through the holder.

In testimony whereof, I have hereunto set my hand.

WILLIAM C. BELMONTE.